United States Patent [19]
Lok

[11] Patent Number: 5,897,072
[45] Date of Patent: Apr. 27, 1999

[54] EXTENDIBLE FISHING REEL CRANK HANDLE

[76] Inventor: Henry C. Lok, 19957 Sunset Vista Rd., Walnut, Calif. 91789

[21] Appl. No.: 08/941,314

[22] Filed: Sep. 30, 1997

[51] Int. Cl.⁶ .................................................. B65H 75/30
[52] U.S. Cl. .............................. 242/395; 242/284; 74/546
[58] Field of Search .................................. 242/395, 395.1, 242/284, 350, 546.1, 564.2; 74/543, 544, 545, 546, 528

[56] References Cited

U.S. PATENT DOCUMENTS

| | | |
|---|---|---|
| 2,326,023 | 8/1943 | Fredricksen . |
| 3,375,993 | 4/1968 | Hayes . |
| 3,606,193 | 9/1971 | Allred . |
| 4,037,488 | 7/1977 | Laney, Sr. . |
| 5,308,020 | 5/1994 | Kawabe . |

*Primary Examiner*—Donald P. Walsh
*Assistant Examiner*—William A. Rivera
*Attorney, Agent, or Firm*—Charles H. Thomas

[57] ABSTRACT

A dual leverage reel of the type used for fishing is constructed so as to have an effective lever arm of adjustable length. The reel employs a crank arm that includes a pair of detent recesses, one of which is located at a distance from the crank arm axis, and the other which is located on or closer to the crank arm axis. A crank arm extension is rotatably coupled to the crank arm at a crank arm extension axis that is parallel to the crank arm axis. The crank arm extension axis passes through the crank arm equidistant from both of the detent recesses. The crank arm extension axis divides the crank arm extension into a longer section having a free end and a shorter section having a latchable end. A retractable detent pin is mounted on the shorter section of the crank arm extension at the latachable end thereof. The retractable detent pin is located at the same distance from the crank arm extension axis as the distance between each of the detent recesses and the crank arm extension axis. A biasing spring urges the detent pin toward the crank arm. In this way the detent is selectively and alternatively engageable with each of the detent recesses to hold the latachable end of the crank arm extension at alternative distances from the crank arm axis. This provides the crank arm extension with lever arms of different lengths and with alternative moments.

21 Claims, 9 Drawing Sheets

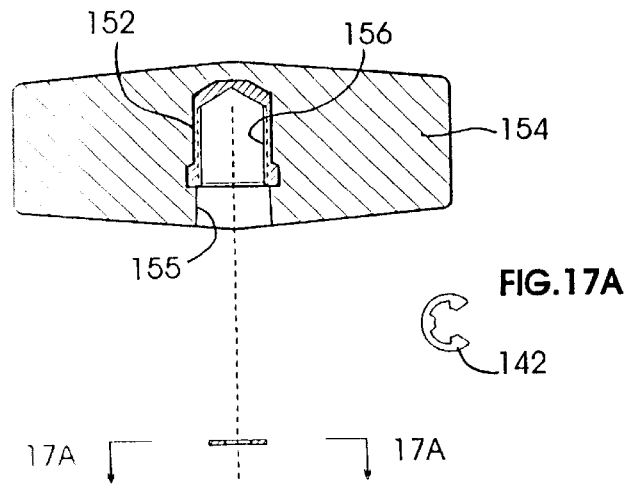
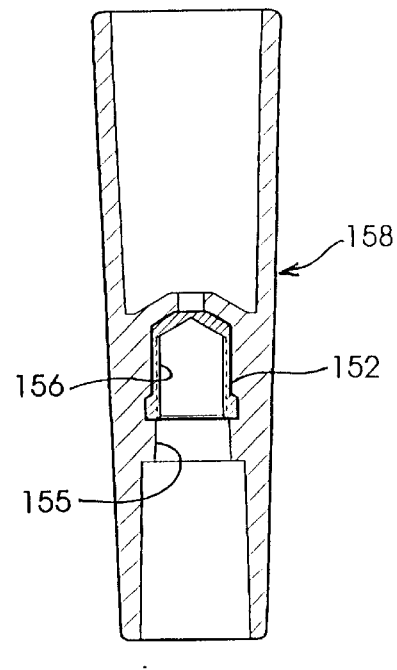
FIG.17A
FIG.18
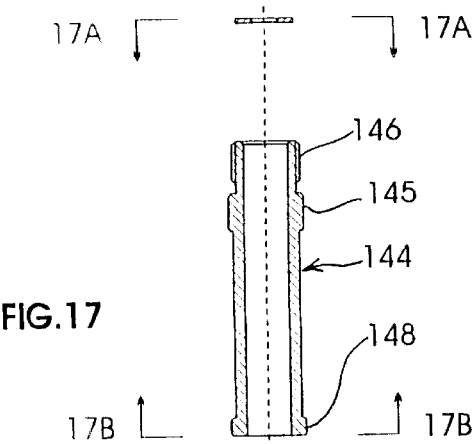
FIG.17
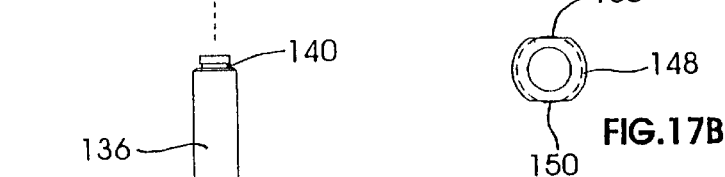
FIG.17B
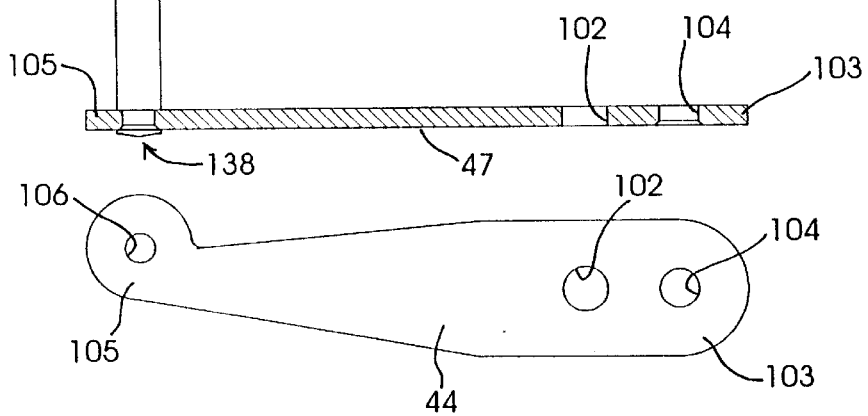
FIG.16

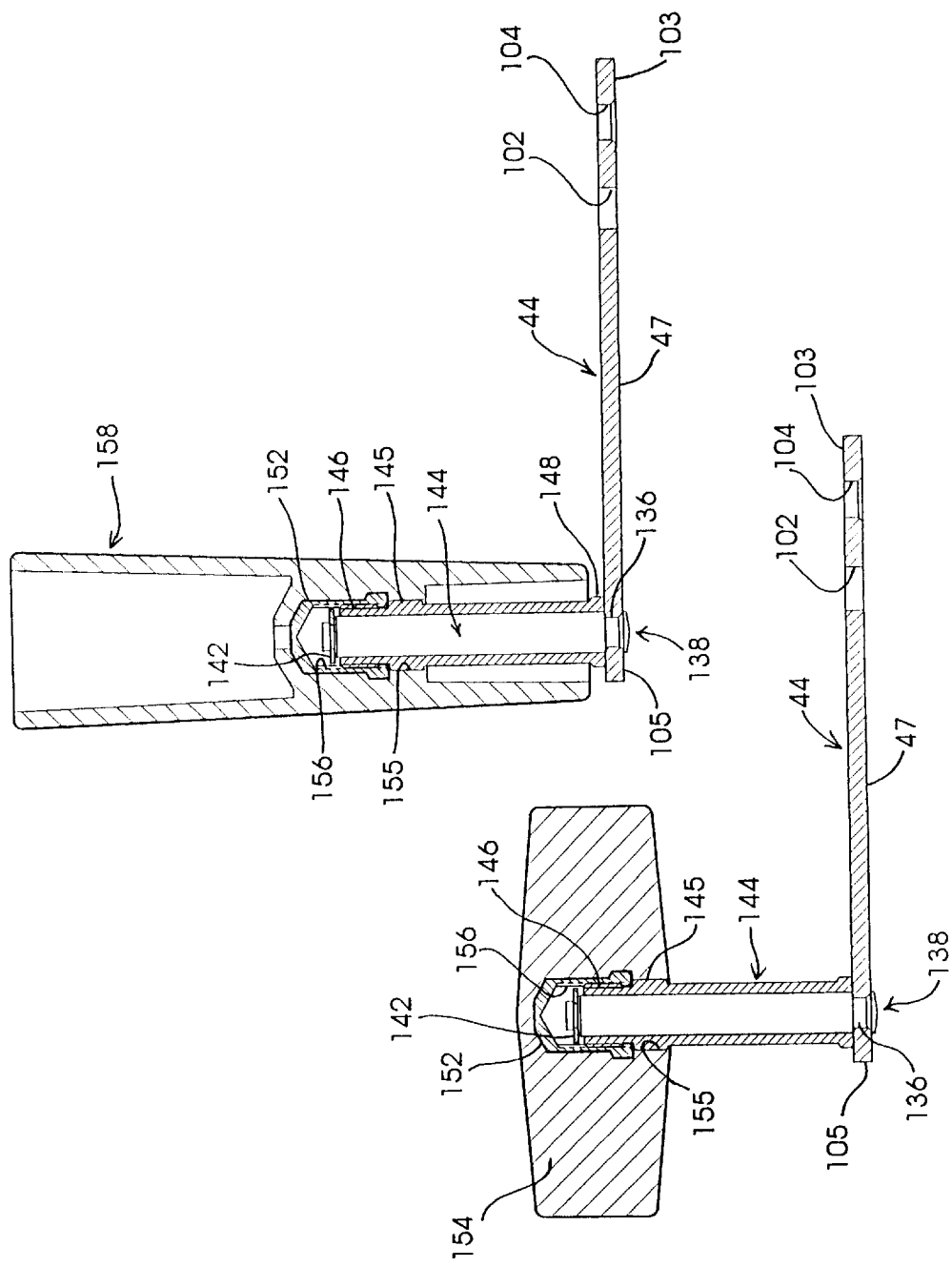

EXTENDIBLE FISHING REEL CRANK HANDLE

BACKGROUND OF THE INVENTION

1. Field of the Invention

The present invention relates to an extendible crank of the type suitable for use on a fishing reel.

2. Description of the Prior Art

In the sport and business of fishing, fishermen utilize fishing rods equipped with reels upon which extended lengths of fishing line are wound. A fishing reel is mounted near the grip end of a fishing pole and the line is threaded through eyelets leading to the distal end of the pole. The fishing reel is equipped with a spool for taking up the line.

The spool of the reel is turned in rotation in a prescribed direction in order to wind the line onto the spool drum. Very typically the reel includes a releasable lock that prevents rotation of the spool in a direction that would unwind the fishing line from the spool drum. An internal pawl and rachet arrangement allows the fisherman to turn the spool in the winding direction only by means of a crank lever that is rotated about a crank arm axis in order to turn the spool in rotation and reel in the line.

When fishing with a conventional fishing reel during periods when there is little or no load on the fishing line, the operator of the device will normally prefer for the spool of the reel to be turned as rapidly as possible in order to retrieve the fishing line as quickly as possible. Therefore, a conventional fishing reel often employs a cranking apparatus having a very short lever arm so that minimal movement of the crank apparatus is required in order to rapidly reel in the line. However, such a cranking apparatus is disadvantageous when a large fish has been hooked, since the force exerted on the line by the fish requires the user to exert considerable power in order to reel in the fish. When the user is forced to exert a high degree of energy and work in reeling in the fish, the user becomes tired and is prone to make mistakes. This often results in a break in the fishing line, whereupon the fish escapes.

In an attempt to remedy this situation, fishing reels are sometimes provided with mechanisms to allow the user to operate the reel with an increased mechanical advantage. This may involve an alternative set of gears in the reel that can be engaged in order to allow the user to exert a greater reeling force with the expenditure of less energy than would otherwise be required. While multiple gear arrangements in a fishing reel do allow a user to operate the reel with a selected force, the use of multiple gear arrangements in a fishing reel decreases the speed at which the fishing line is retrieved.

Various attempts have been made to provide fishermen with an alternative system for obtaining a mechanical advantage in operating the reel. Several different arrangements have been devised with the purpose of extending the length of the fishing reel crank arm at the election of the user. One such system is described in U.S. Pat. No. 3,060,193. This device discloses a fishing reel crank arm which is adjustable in effective length by means of an elongated slot in the fishing reel crank arm and a clamping screw that can be used to hold the free end of the crank arm upon which the crank arm handle is rotatably mounted, at a selected distance from the crank arm axis. However, this device, while theoretically operable in the manner intended, is simply not practical. This is because the time at which it is advantageous to switch from a short to a long lever crank arm occurs at the precise time when a fish has suddenly struck the bait and is exerting tension on the line. A device that requires loosening of a screw, sliding of the crank arm toward the crank arm axis, and retightening the screw, all while playing the fish on the end of the line, is impractical. The user simply cannot perform the necessary mechanical operations required to change the effective length of the crank arm while also holding the rod and manipulating it in the manner necessary to bring in the fish.

Another crank arm adjustment apparatus is described in U.S. Pat. No. 4,479,616. This device also employs a slotted crank arm but relies upon an over-center toggle mechanism for yieldable retaining the slide bar in either of two alternative positions. Again, however, while theoretically workable, this device has the practical disadvantage of a likely unintentional operation and reversal of the toggle mechanism when in actual use. As a consequence, there is a considerable likelihood that this device will abruptly change from an adjustment in which the crank arm is extended to the alternative position while the user attempts to reel in a fish.

SUMMARY OF THE INVENTION

The present invention is a dual-leverage reel of the type suitable for fishing which employs an entirely different concept and mechanism for adjusting the effective crank arm length of a reel to either of two alternative positions. Specifically, the system of the present invention involves a crank arm extension which is rotatably joined to the crank arm that is coupled to the spool of the reel at a crank arm extension axis that is radially displaced from the axis of the crank arm itself. The crank arm extension is equipped with a retractable detent pin radially spaced from the crank arm extension axis the same distance that the crank arm extension axis is displaced from the crank arm axis.

The crank arm itself is provided with a pair of detent recesses. These detent recesses are positioned on the crank arm at different radial distances from the crank arm axis. That is, one of the detent recesses is radially displaced from the crank arm axis a greater distance than the other. The crank arm extension axis passes through an imaginary straight line extending between the two detent recesses. Preferably, one of the detent recesses lies twice the distance from the crank arm axis as does the crank arm extension axis, while the other detent recess lies on and is coaxial with the crank arm axis. The crank arm extension axis thereby bisects the distance between the detent recesses.

Utilizing a crank arm, a crank arm extension, and a detent mechanism of this type, the effective operating length of the crank mechanism can be varied by alternatively engaging the detent pin in the two detent recesses. When the detent pin is engaged in the detent recess that lies on the crank arm axis, the free end of the crank arm extension bearing the crank handle is at the greatest distance from the crank arm axis. This provides the greatest mechanical advantage to minimize the force required to turn the crank using the crank handle. Alternatively, when the detent pin is engaged in the detent recess located on the opposite side of the crank arm extension axis from the crank arm axis, the effective length of the crank lever is shortened, thus minimizing the distance which the free end of the crank arm extension must travel in order to turn the spool one revolution. This reduces the physical movement of the hand and arm, and thus helps the fisherman wind faster and reduces physical stress.

In one broad aspect the present invention may be described as a dual-leverage reel comprising several elements. A spool is required for winding a line. A crank arm having a crank arm axis is also required and is coupled to drive the spool in rotation. A pair of detent recesses are defined on the crank arm. One of the recesses is radially displaced from the crank arm axis a greater distance than the other.

A crank arm extension having a free end and a latching end is also necessary. A crank arm extension axle defines a crank arm extension axis that is parallel to the crank arm axis and joins the crank arm extension between free and latching ends thereof to the crank arm at a location thereon equidistant from both of the detent recesses and in linear radial alignment therewith relative to the crank arm axis. This construction defines a common crank arm extension offset distance between each of the detent recesses and the crank arm extension axis.

A retractable, spring loaded detent pin which is biased toward the crank arm is mounted on the latching end of the crank arm extension at the same offset distance from the crank arm extension axis as the detent recesses. The detent pin is selectively and alternatively engageable in both of the detent recesses to thereby hold the free end of the crank arm extension at alternative distances from the crank arm axis. The crank mechanism can thereby be operated with lever arms of different lengths.

Cam surfaces are preferably provided on the crank arm to automatically depress the detent pin as the crank arm extension is rotated relative to the crank arm in switching from one effective lever arm to the other. The system is also preferably provided with alternative, detachable handgrips, including a T-shaped handle and a straight handle. These may be alternatively and detachably joined to the crank arm extension by means of left-hand thread connections.

In another broad aspect the invention may also be considered to be a dual-leverage reel comprising a take-up spool, a crank arm, a pair of detent recesses, a crank arm extension axle, a crank arm extension, a detent pin, and a spring. The take-up spool is provided for winding a length of line while the crank arm is rotatable about a crank arm axis and is coupled to drive the spool in rotation. The detent recesses are defined on the crank arm. One of the detent recesses in the pair is radially displaced from the crank arm axis a greater distance than the other.

The crank arm extension axle defines a crank arm extension axis that is parallel to the crank arm axis. The crank arm extension axle is coupled to the crank arm midway between the detent recesses. Each of the detent recesses lies at a crank arm extension offset distance from the crank arm extension axis. The crank arm extension has a free end and an opposite latching end. The crank arm extension axle couples the crank arm extension between the free end and the latching end thereof to the crank arm for rotation relative thereto. The detent pin is mounted on the latching end of the crank arm extension at a distance from the crank arm extension axis equal to the crank arm extension offset distance. The spring urges the detent pin toward the crank arm. The detent pin is selectively and alternatively engageable with each of the detent recesses so that a force of rotation is applicable to the spool from the free end of the crank arm extension with alternative mechanical moments.

In still another aspect the invention may be considered to be a dual-leverage reel comprising a number of elements. A take-up spool is provided for winding and unwinding a length of line thereon and is rotatable about a spool axis. A crank arm is rotatable about a crank arm axis and is coupled to rotate the spool. The crank arm includes a pair of detent recesses, one of which is located at a greater radial distance from the crank arm axis than the other. A crank arm extension is rotatably coupled to the crank arm at a crank arm extension axis that is parallel to the crank arm axis. The crank arm extension axis passes through the crank arm equidistant from both of the detent recesses. The crank arm extension axis divides the crank arm extension into a longer section having a free end and a shorter section having a latchable end.

A retractable detent pin is directed toward the crank arm and is located on the shorter section of the crank arm extension at the latchable end thereof. The detent pin is located at the same distance from the crank arm extension axis as the distance between each of the detent recesses and the crank arm extension axis. A spring biasing means urges the detent pin toward the crank arm. The detent pin is selectively and alternatively engageable with each of the detent recesses to hold the latchable end of the crank arm extension at alternative distances from the crank arm axis. This provides the crank arm extension with lever arms of different lengths.

Since the pawl and ratchet mechanism coupling the crank arm to the spool of a fishing reel will normally be engaged when a fish is hooked, the crank arm is normally coupled to rotate in a single direction of rotation relative to the crank arm axis when a change in crank arm leverage is desired. In conventional practice the free end of the crank arm extension is rotated in a clockwise direction, when viewed from the crank arm end of the reel, in order to wind the line onto the spool. Counterrotation of the crank arm cannot occur when the pawl and ratchet mechanism of the reel is engaged.

Since the user will normally be predisposed to turn the crank arm extension in the direction that will cause the crank arm to turn when a change in effective lever arm lengths is desired, it is highly desirable for the dual-leverage reel to be constructed so that continued rotation of the crank arm extension in the line winding direction will cause engagement of the detent pin in the other detent recess once it has been released from the first detent recess in which it is engaged.

The crank arm and the crank arm extension are both preferably constructed with plate-like surfaces arranged in a mutually facing disposition. The crank arm has side walls into which a pair of detent pin-receiving gate openings are preferably formed at the crank arm extension offset distance from the crank arm extension axis. These gate openings permit passage of the detent pin in its condition extended form the crank arm extension toward the crank arm.

The crank arm also preferably has a cam surface leading from each of the gate openings toward the detent recesses. These cam surfaces progressively depress the detent pin so that it will spring outward once it reaches registration with a detent recess. At this point the detent pin latches in the detent recess with which it has reached coaxial alignment.

Preferably also, an abutment is defined at each of the detent recesses on the opposite side thereof from its cam surface and gate opening. This abutment ensures that the detent pin cannot be rotated past the detent recess with which it has reached alignment, unless purposefully retracted by the user.

A further feature of the preferred embodiment of the invention is a detachable handgrip. In conventional fishing reels the handgrip extends outwardly from the crank arm in a direction parallel to the crank arm axis so as to provide the user with a convenient hand grasp for rotating the crank arm relative to the crank arm axis. When fishing for surf fish, people generally prefer the use of a T-shaped handle or handgrip. Such a handle has a stem or shank that projects outwardly from the free end of the crank arm parallel to the crank arm axis, and a cross piece that is rotatably mounted at its center to extend perpendicular to the handle shank or shaft. A T-shaped handle such as this provides the user with an easy grip, both when pumping and reeling in order to reel in an struggling or fighting fish.

On the other hand, for deep sea fishing and for bottom fishing, for example when fishing for rock cod, people prefer straight handles. A straight handle is formed as a tube or shaft that projects outwardly from the crank arm parallel to the crank arm axis. Such a handgrip is normally rotatably mounted relative to the free end of the crank arm for rotation about its own axis. Straight handles provide an easy push down and wind up type of reeling action when the fishing rod rests on the rail of a boat.

Most handles of conventional fishing reels cannot be changed, since they are permanently fixed to either the bushings or to the spindles. As a result, people using conventional reels must change the entire assembly, including the crank, if they wish to change from one type of handgrip to another, for example from a T-shaped grip to a straight grip.

According to the present invention, on the other hand, the crank arm extension is provided with a detachable handgrip. This system as sold preferably includes alternative handgrips, including both a T-shaped grip and a straight grip. Both of these handgrips are detachable from the free end of the crank arm extension and are attachable thereto in alternation with each other.

Preferably, this attachment is performed by means of a left-hand threaded connection. This system is ideal since the crank arm is normally mounted on the reel so as to rotate in but a single direction of rotation. As a consequence, the normal rotation of the crank mechanism by means of the handgrip extension will only serve to tighten the engagement of a left-hand threaded connection. Nevertheless, the handgrip may be readily detached from the free end of the handgrip extension by rotating the handgrip relative to the handgrip extension so as to unscrew the left-hand threaded connection therebetween.

The present invention has a further significant advantage in that an otherwise conventional fixed leverage fishing reel may be easily and inexpensively modified to create a dual-leverage reel according to the invention using parts provided in the form of a kit. This greatly minimizes the expense of the invention, since the basic conventional structure of a reel including the spool, gear mechanism, pawl and ratchet mechanism, rod clamp and reel housing may all be reused. A dual-leverage reel may be created according to the present invention by providing in a kit form a substitute crank arm and a crank arm extension equipped with a detent mechanism of the type described. Alternative detachable handgrips, and simple tools that allow even an unskilled user to effectuate the conversion of a fixed leverage reel to a dual-leverage reel may also be supplied according to the present invention.

The invention may be described with greater clarity and particularity by reference to the accompanying drawings.

DESCRIPTION OF THE DRAWINGS

FIG. 16 is a top plan view of the crank arm extension of the invention shown in isolation.

FIG. 17 is an exploded sectional elevational view illustrating attachment of one of the detachable handgrips to the free end of the crank arm extension of the invention.

FIG. 17A is a plan detail taken along the lines 17A—17A of FIG. 17.

FIG. 17B is a plan detail taken along the lines 17B—17B of FIG. 17.

FIG. 18 is a sectional elevational detail showing an alternative handgrip in isolation.

FIG. 19 is a sectional elevational view showing the components of FIG. 17 assembled together.

FIG. 20 is a sectional elevational view showing the handgrip of FIG. 18 mounted on the crank arm extension of the invention.

DESCRIPTION OF THE EMBODIMENT

Figure 1:
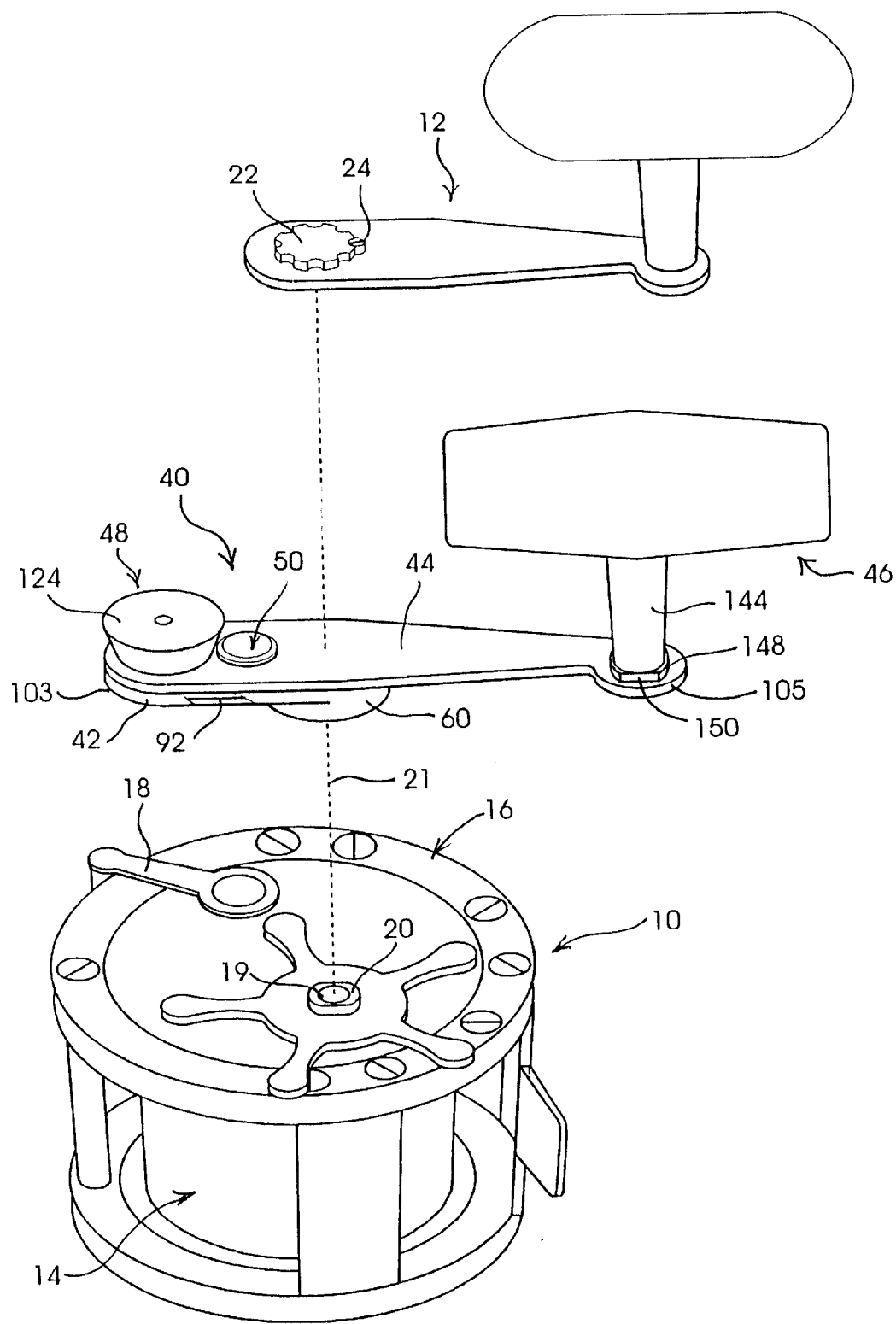
FIG. 1 is an exploded perspective view illustrating the removal of a conventional crank arm and substitution of components in place thereof in order to convert a conventional fixed leverage reel to a dual-leverage reel according to the present invention.

FIG. 1 illustrates a fishing reel spool and drive assembly 10, which when equipped with a conventional crank arm 12 forms a conventional fixed leverage fishing reel. The assembly 10 is equipped with a spool 14 upon which fishing line is wound. Within the housing 16 of the assembly 10 there is a conventional gear mechanism and also a conventional pawl and ratchet mechanism, which when engaged, restrict the rotation of the spool 14 to a single direction of rotation. When these mechanisms are disengaged the spool 14 is freely rotatable in either direction. The pawl and ratchet mechanism are engaged and disengaged relative to the spool 14 by a conventional ratchet engaging and disengaging lever 18 which may be moved between alternative positions relative to the reel spool and drive assembly housing 16.

The conventional crank arm 12 has an elongated mounting aperture therein that snugly fits about the upper end 20 of the sprocket drive shaft. The shape of the outer surface of the upper end 20 of the sprocket drive shaft and the corresponding shape of the mounting aperture in the crank arm 12 is such that the crank arm 12 cannot rotate relative to the sprocket drive shaft when mounted on the upper end 20 thereof.

The crank arm 12 is secured to the upper end 20 of the sprocket drive shaft by means of a conventional retaining screw 22. The retaining screw 22 has a threaded shank that is screwed into an internally tapped bore 19 down the center of the upper end 20 of the sprocket drive shaft. This tapped drive shaft bore 19 defines the crank arm axis 21. The head of the conventional retaining screw 22 is not round, but rather has a plurality of radially inwardly directed indentations. The indentations define therebetween radially outwardly directed teeth about the outer circumference of the head of the retaining screw 22.

A small diameter tapped opening is defined in the structure of the crank arm 12 at a distance from the crank arm axis 21 corresponding to the radial distance of the peripheral, radial indentations in the head of the retaining screw 22. In a conventional fishing reel the threaded shank of a small locking screw 24 is engaged in this tapped opening in the crank arm 12 and the head of the locking screw 24 resides in registration with one of the radial indentations in the head of the retaining screw 22 between the teeth immediately adjacent thereto. The head of the locking screw 24 thereby prevents the shank of the retaining screw 22 from becoming disengaged from the tapped bore in the upper end 20 of the sprocket drive shaft as long as the locking screw 24 remains engaged with the crank arm 12. Without the locking screw 24 it is possible for the retaining screw 22 to work itself loose from engagement in the upper end 20 of the spool drive shaft.

Figures 21, 22:
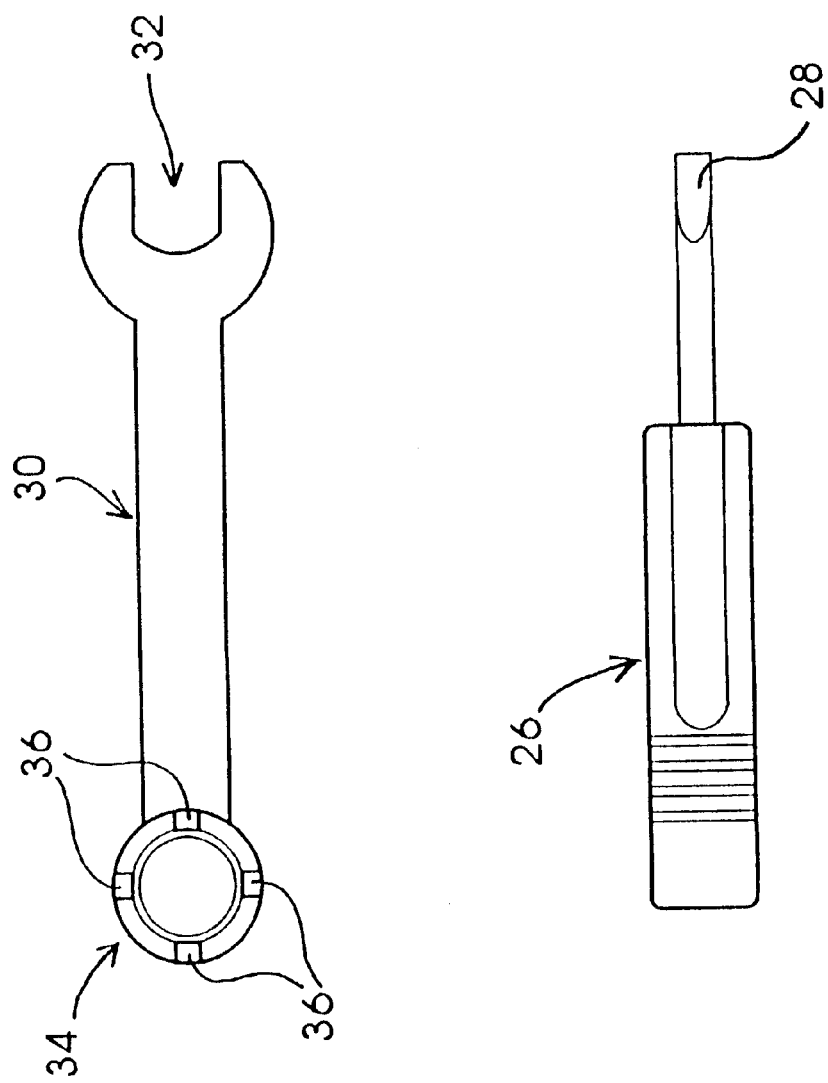
FIG. 21 is a plan view of a wrench useful in the assembly and disassembly of the invention.
FIG. 22 is a plan view of a screwdriver useful in the assembly and disassembly of the invention.

In order to convert the fishing reel depicted from a fixed leverage to a dual-leverage reel, it is necessary to remove and replace the conventional crank arm 12. This is accomplished by first unscrewing the locking screw 24 with a small blade screwdriver 26, depicted in isolation in FIG. 22. The screwdriver 26 has a blade 28 that engages the slot in the head of the locking screw 24 in a conventional manner. The conventional retaining screw 22 is thereupon removed.

Figure 2:
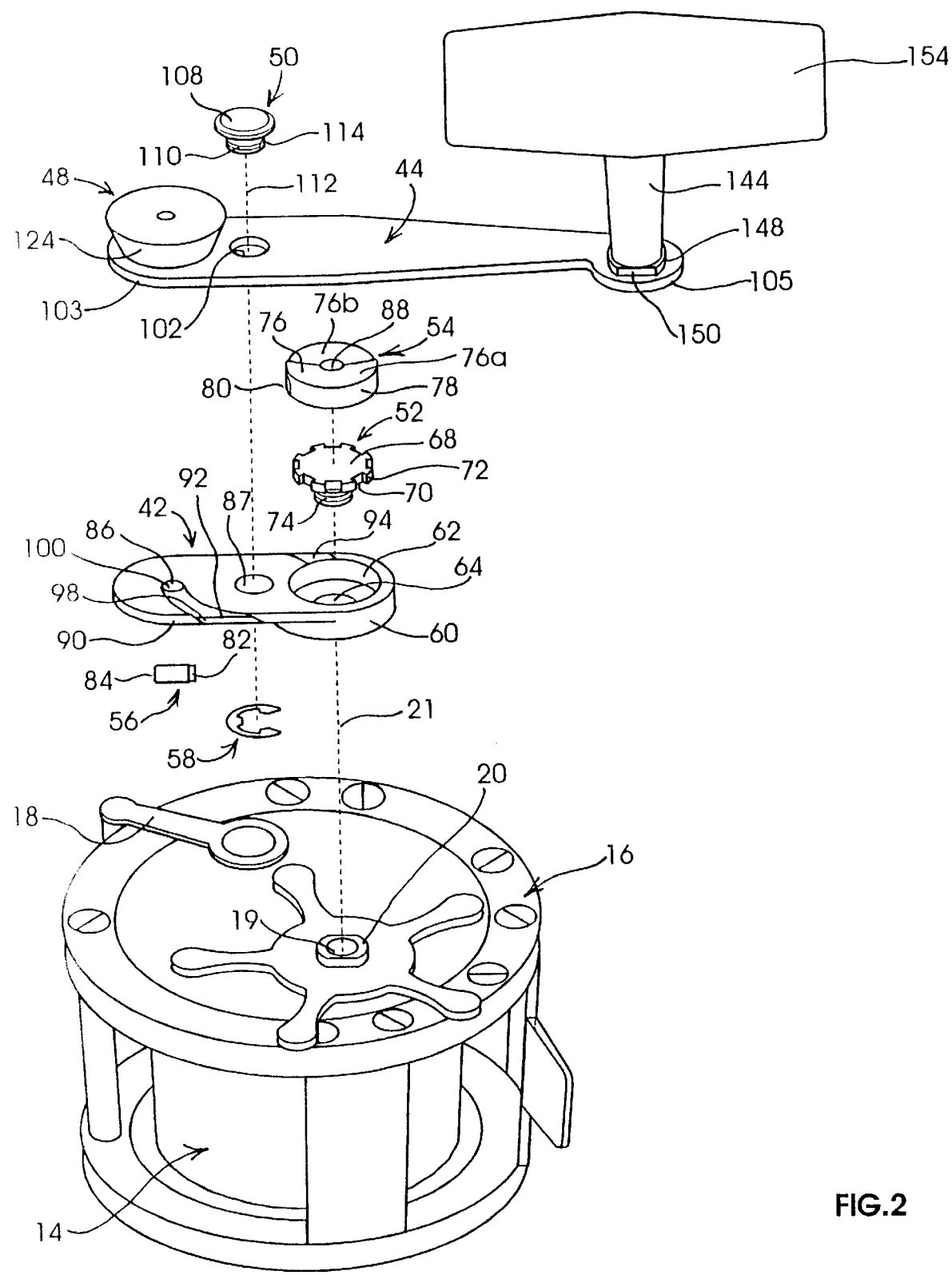
FIG. 2 is an exploded perspective view illustrating the components of a dual-leverage reel according to the present invention in a more complete state of disassembly.

Once the conventional crank arm 12 has been removed from the reel spool and drive assembly 10 as depicted in FIG. 1, a substitute crank assembly 40 is installed in place thereof. The crank assembly 40 includes a crank arm 42, a crank arm extension 44, a detachable handgrip 46, a spring biased detent pin assembly 48, and a crank arm extension axle 50, all depicted in FIG. 1. In addition, the substitute crank assembly 40 also includes a retaining screw 52, a retaining screw cap 54, a cylindrical locking pin 56, and a C-shaped snap ring 58, which are depicted in FIG. 2.

The spool drive shaft has a crank attachment end 20 protruding from the spool and drive assembly housing 16 that encases the spool 14 and has an axially tapped bore 19 that defines the crank arm axis 21. The crank arm 42 includes a longitudinally projecting boss 60 having a short, cylindrical shape and defining therein a concave, crank-retaining screw seating cavity 62. An axial shaft opening 64 of elongated configuration is defined in the transverse floor of the boss 60. The axial shaft opening 64 in the boss 60 fits onto the crank attachment end 20 of the spool drive shaft in keyed engagement therewith.

The boss 60 also defines a small diameter, cylindrical, radially directed locking pin opening 66 through its annular wall. The locking pin opening 66 is directed toward the end of the crank arm 42 opposite that at which the boss 60 is formed. The locking pin opening 66 is oriented radially relative to the crank arm axis 21.

The crank assembly 40 includes a crank retaining screw 52 which is similar in some respects to the crank retaining screw 22 in a conventional, fixed leverage reel system. The crank retaining screw 52 has a head 68 into the periphery of which a plurality of squared off indentations 70 are defined. The indentations 70 are separated by radially outwardly projecting protrusions 72, which have a tooth-like configuration. The shank 74 of the crank retaining screw 52 is externally threaded and is threadably engaged in the internally tapped bore 19 in the crank attachment end 20 of the spool drive shaft.

Figures 3, 4:
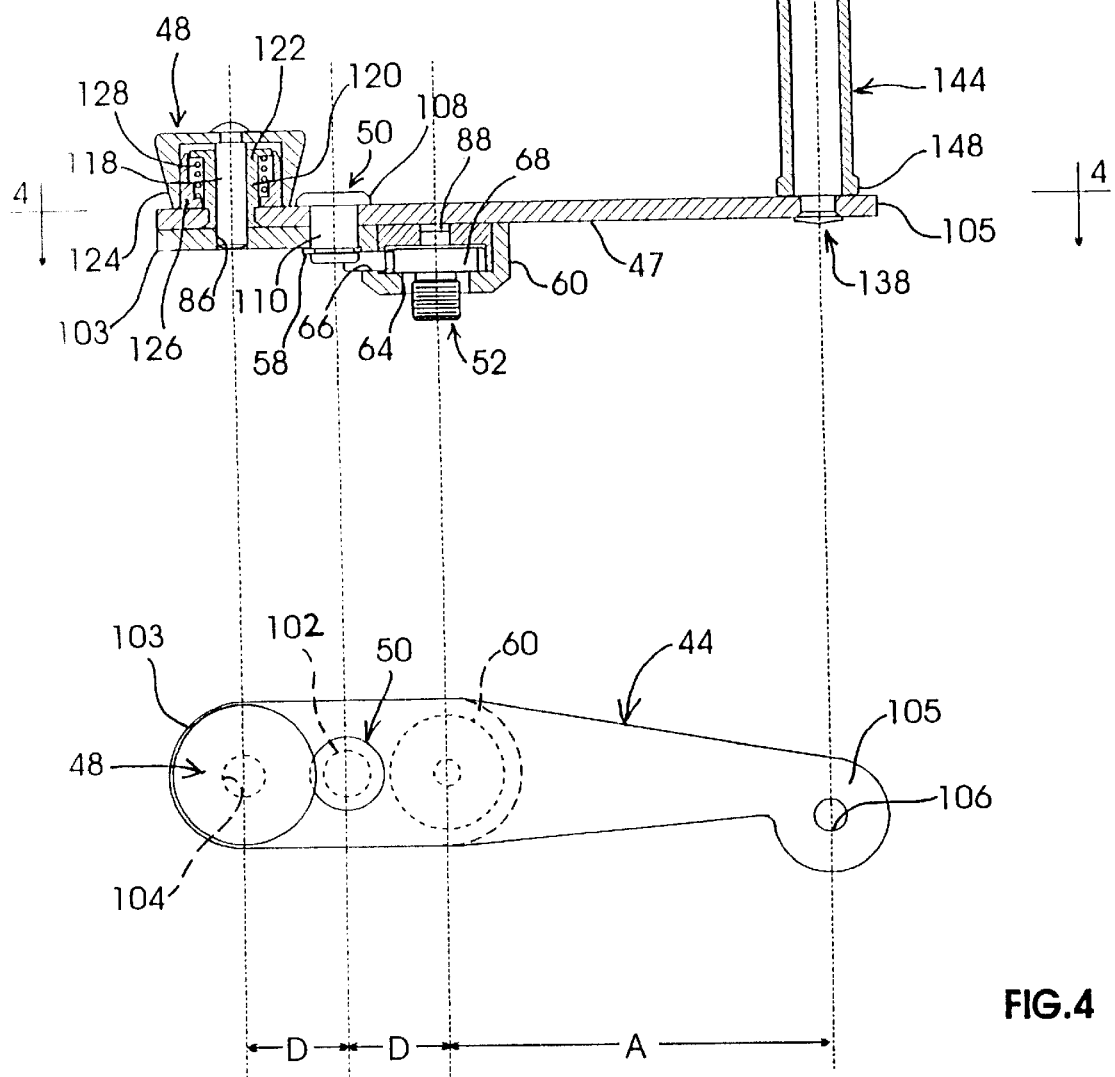
FIG. 3 is a sectional elevational view of the assembled components necessary to convert a fixed leverage reel to a dual-leverage reel according to the invention engaged to provide the crank mechanism with a relatively short lever arm.
FIG. 4 is a sectional plan view taken along the lines 4—4 of FIG. 3.
Figures 5, 6:
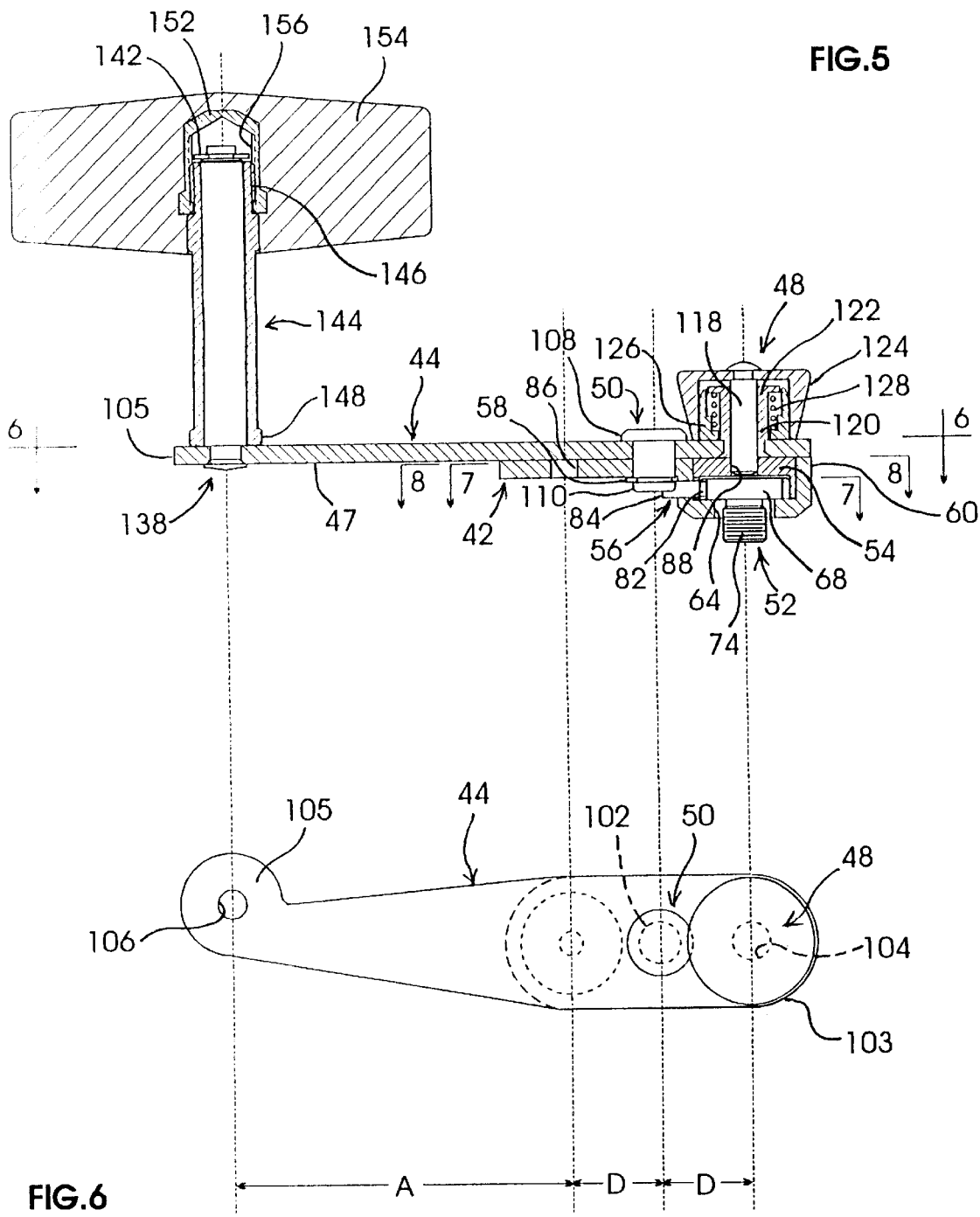
FIG. 5 is a sectional elevational view of the assembled components necessary to convert a fixed leverage reel to a dual-leverage reel according to the invention engaged to provide the crank mechanism with a relatively long lever arm.
FIG. 6 is a sectional plan view taken along the lines 6—6 of FIG. 5.

The crank assembly 40 also includes a hollow, cup-shaped cap 54 formed with a top 76 and an annular skirt 78 that depends from the top 76. The cap 54 fits into the retaining screw seating cavity 62 so that the top 76 covers the crank retaining screw head 68 as best depicted in FIGS. 3 and 5.

Figure 9:
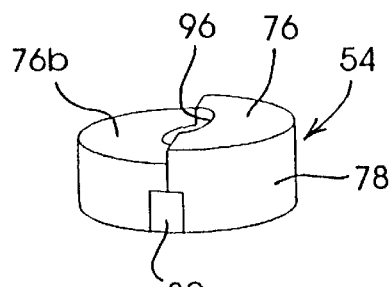
FIG. 9 is a perspective view of the retaining screw cap employed in the embodiment of the invention illustrated.
Figure 10:
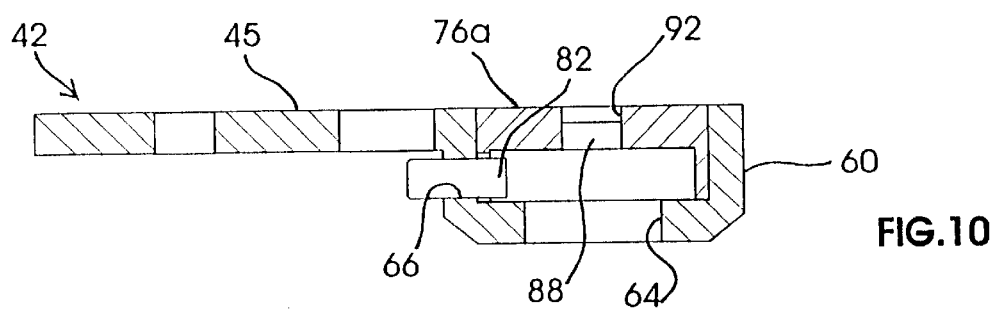
FIG. 10 is a sectional elevational detail taken along the lines 10—10 of FIG. 8 from which the retaining screw has been omitted.

The cap skirt 78 has a radial opening 80 therein as illustrated in FIG. 9. The locking pin 56 has a first end 82 and an opposite, second end 84. The radial opening 80 in the skirt 78 of the cap 54 receives therethrough the first end 82 of the locking pin 56, as best depicted in FIG. 10.

A pair of detent recesses 86 and 88 are defined on the crank arm 42. The detent recess 86 is defined in the actual structure of the crank arm 42 on the upper surface thereof remote from the boss 60. The other detent recess 88 is formed in the top 76 of the cap 54. Both of the detent recesses 86 and 88 are formed as pockets that face the crank arm extension 44 and extend parallel to the crank arm axis 21. The detent recess 86 is radially displaced from the crank arm axis 21 a greater distance than the other detent recess 88. In fact, in the preferred embodiment of the invention illustrated, the detent recess 88 lies directly on the crank arm axis 21.

The crank arm 42 has a flat, upper surface 45 that is parallel to the flat, undersurface 47 of the crank arm extension 44. These mutually facing, parallel surfaces 45 and 47 reside perpendicular to the orientation of the detent recesses 86 and 88 and perpendicular to the crank arm axis 21. The crank arm 42 has a side wall 90 into which a detent pin receiving gate opening 92 is formed. Another detent pin receiving gate opening 94 is formed in the wall of the crank arm 42 above the boss 60 depending therefrom.

The top 76 of the cap 54 forms a roof over the head 68 of the crank retaining screw 52. The top 76 of the retaining screw cap 54 is configured with a flat, semicircular-shaped surface 76a that lies in a plane perpendicular to the crank arm axis 21. The remaining portion 76b of the upper surface of the top 76 of the cap 54 is stepped down from the surface 76a to form a vertical abutment 96, illustrated in FIG. 9.

From the abutment 96 the surface 76b extends parallel to the surface 76a and outward away from the detent recess 88 and the surface 76a and toward the detent pin gateway 94.

Figure 15:
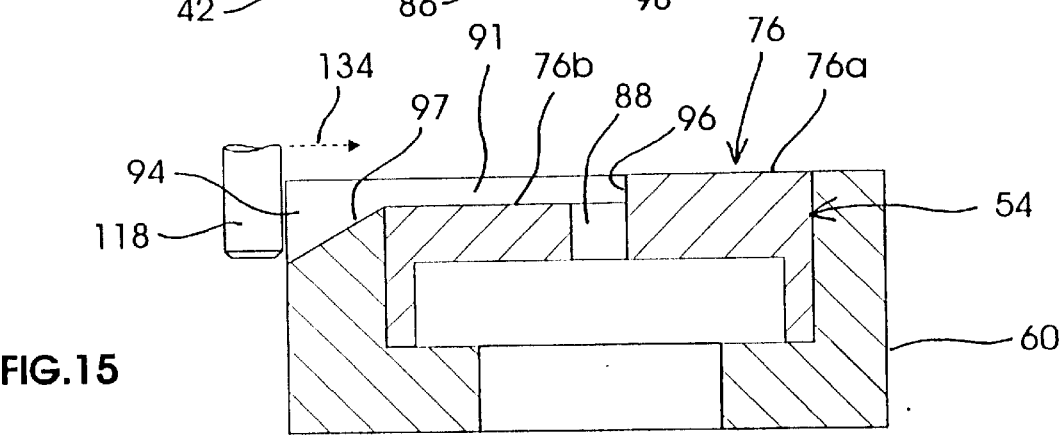
FIG. 15 is a sectional elevational detail illustrating movement of the detent pin into engagement with the other of the detent recesses in embodiment of the invention illustrated.

The gate opening 94 forms a gap in the side wall of the crank arm 42 above the boss 60. A channel 91 is formed at the gate opening 94, the floor 97 of which is inclined upwardly and inwardly, as best illustrated in FIG. 15. The channel floor surface 97 thereby forms a cam surface on the crank arm 42 leading from the detent pin gateway 94 and toward the detent recess pocket 88. The detent abutment 96 is located beyond the detent pocket 88 on the side thereof opposite the cam surface 97.

Figure 7:
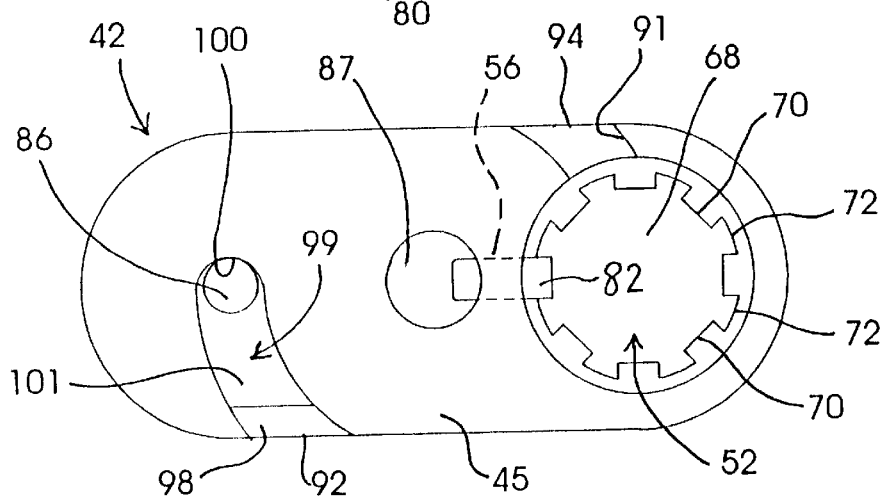
FIG. 7 is a sectional plan view taken along the lines 7—7 of FIG. 5.
Figure 8:
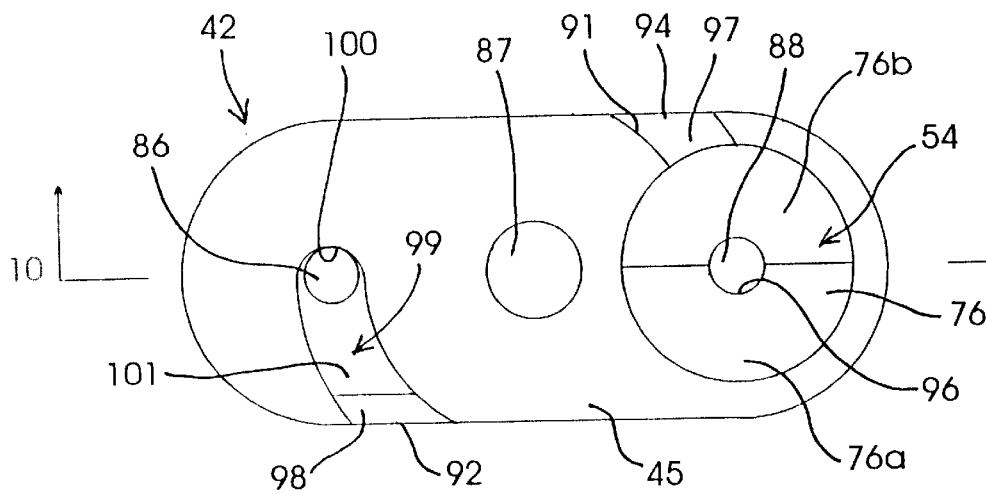
FIG. 8 is a sectional plan view taken along the lines 8—8 of FIG. 5.
Figure 14:
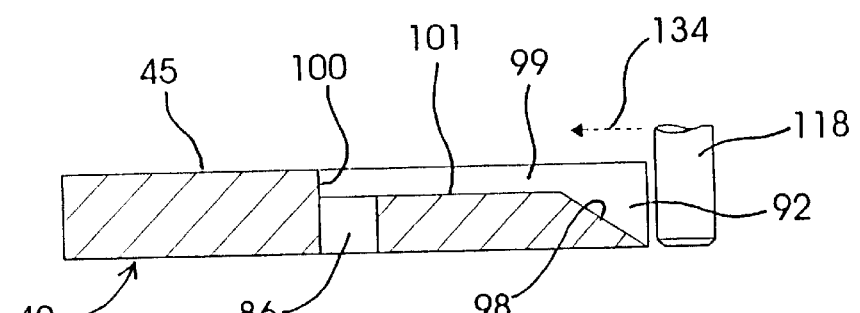
FIG. 14 is a sectional elevational detail illustrating movement of the detent pin into engagement with one of the detent recesses in the embodiment of the invention illustrated.

At the opposite end of the cam arm 42 another cam surface 98 is defined to slope upwardly from the detent pin gateway 92 toward the detent recess 86. The structure of the crank arm 42 on the far side of the detent recess 86 opposite the cam surface 98 forms a detent abutment 100, as best depicted in FIGS. 7, 8, and 14.

The crank arm extension 44 is formed as a flat, elongated plate of metal, configured as illustrated in isolation in FIG. 16. The crank arm extension 44 includes a circular pivot opening 102 for receiving the crank extension axle 50, a detent pin opening 104 on one side of the crank extension axle opening 102, and a handle mounting opening 106 on the opposite side thereof.

The crank arm extension 44 has a free end 105 in which the handle mounting opening 106 is formed and an opposite, latching end 103 in which the detent pin opening 104 is defined. The crank arm extension axle 50 couples the crank arm extension 44 between the free end 105 and the latching end 103 thereof to the crank arm 42 for rotation relative thereto.

Figure 11:
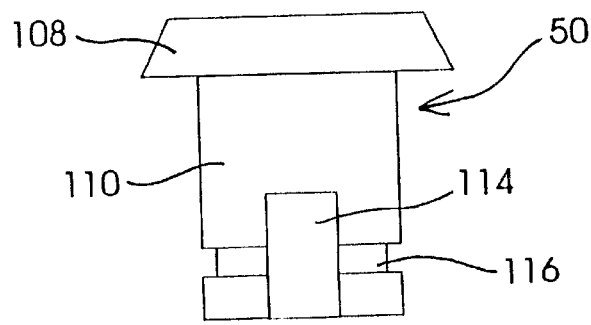
FIG. 11 is a side elevational detail of the crank arm extension axle employed in the embodiment of the invention depicted.
Figure 13:
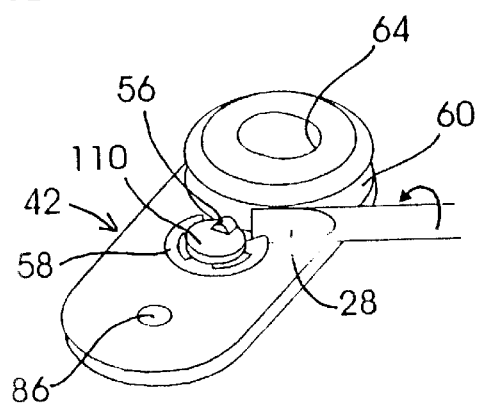
FIG. 13 is a perspective detail that illustrates the technique for removing the C-shaped snap ring from the crank arm extension axle of FIG. 11.
Figure 12:
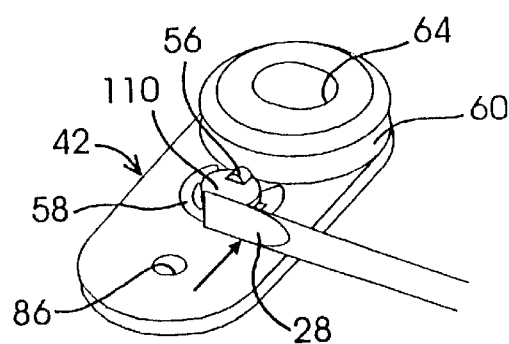
FIG. 12 is a perspective detail that illustrates the technique for engaging the C-shaped snap ring with the crank arm extension axle of FIG. 11.

The crank arm extension axle 50 is illustrated in isolation in FIG. 11. The crank arm extension axle 50 is formed as a cylindrical pin having a proximal end with an enlarged head 108. The distal end 110 of the crank arm extension axle 50 has a smooth, generally cylindrical wall interrupted by a radially directed channel 114 defined therein. The channel 114 is configured to receive the end 84 of the locking pin 56, as best depicted in FIGS. 3, 5, and 13.

Near the tip of the distal end 110 of the crank arm extension axle 50 an annular, radially inwardly directed snap ring seating channel 116 is formed. The snap ring seating channel 116 has channel width suitable for accommodating the C-shaped snap ring 58 illustrated in FIGS. 2 and 13.

The crank arm extension axle 50 defines a crank arm extension axis 112 that is parallel to the crank arm axis 21. The crank arm extension axle 50 is coupled to the crank arm 42 midway between the detent recesses 86 and 88. As a result, the detent recesses 86 and 88 lie at a crank arm extension offset distance indicated at D in FIGS. 4 and 6 from the crank arm extension axis 112.

The crank assembly 40 is provided with a detent pin assembly 48, best illustrated in FIGS. 3 and 5. The detent pin assembly 48 includes a cylindrical detent pin 118 that is directed toward the plane in which the upper surface 45 of the crank arm 42 lies. The detent pin 118 projects down the center of the detent pin mounting tube 120, through the detent pin opening 104, and downwardly beyond the plane of the undersurface 47 of the crank arm extension 44. The detent pin 118 projects beyond the undersurface 47 of the crank arm extension 44. The detent pin assembly 48 has a cylindrical, annular mounting tube 120, the lower end of which is swedged or otherwise secured in the detent pin opening 104. At its upper extremity the detent mounting tube 120 has a radially outwardly projecting bearing flange 122.

The detent pin assembly 48 also includes a hollow, concave, downwardly facing, annular detent knob 124. The knob 124 has a flat roof with a small opening in its center, and a downwardly projecting, annular skirt. The detent pin 118 is anchored at the center opening in the roof of the detent knob 124. On its inner wall at its lower extremity the depending skirt of the detent knob 124 has a radially inwardly directed, annular spring support 126 that forms a spring seat.

A coil spring 128 is disposed within the confines of the hollow knob 124 and is partially compressed between the spring seat formed by the spring support 126 and by the bearing ledge 122 at the upper end of the detent mounting tube 120. The spring 128 thereby biases the knob 124, and hence also the detent pin 118 toward the crank arm 42. The spring 128 bears against the bearing ring 122, which is fixed relative to the crank arm extension 44, and urges the spring seat 126 downwardly until the skirt of the detent knob 124 meets the upper surface of the crank arm extension 44. In this position the detent pin 118 projects through the detent pin opening 104 and beyond for engagement in either the detent recess 86 or the detent recess 88.

To install the crank assembly 40 on the reel spool and drive assembly 10, the crank arm 42 is first fitted onto the spool drive shaft so that the crank attachment end 20 of the spool drive shaft fits into the mounting opening 64. The shank 74 of the crank retaining screw 52 is then directed down through the opening 64 and engaged in the tapped bore 19 in the crank attachment end 20 of the spool drive shaft. The head 68 of the crank retaining screw 52 may be turned using the end 34 of the wrench 30 depicted in FIG. 21. One end of the wrench 30 is equipped with a conventional pair of fixed jaws indicated in FIG. 21 generally at 32 of the type known as open wrench jaws. The opposite end 34 of the wrench 30 has four lugs 36 spaced at equal angular distances about a common axis of orientation that is perpendicular to the body of the structure of the wrench 30. The lugs 36 at the end 34 of the wrench 30 engage the recesses 70 so that the crank retaining screw 52 may be advanced by rotating the head 68 thereof utilizing the wrench 30.

The crank retaining screw 52 is advanced until the head 68 thereof bears down upon the transverse floor of the boss 60 in which the crank arm mounting opening 64 is formed. The crank arm retaining screw 52 is tightened so that its head 68 clamps the crank arm 42 onto the spool drive shaft at the crank attachment end 20 thereof. Care is taken to ensure that in tightening the retaining screw 52 one of the radial indentations 70 in the head 60 thereof lies in direct radial alignment with the locking pin opening 66 in the wall of the boss 60. When the retaining screw 52 is tightened, the head 68 thereof is also longitudinally aligned with the locking pin opening 66.

There is sufficient clearance between the underside of the crank arm 42 and the reel spool and drive assembly housing 16 to allow the first end 82 of the locking pin 56 to be inserted into the locking pin opening 66. The locking pin 56 is radially advanced toward the crank arm axis 21 so that the end 82 thereof fits into the aligned radial indentation 70 in the head 68 of the crank retaining screw 52. Thus, the crank retaining screw 52 can be restrained from turning loose.

The retaining screw cap 54 is then lowered into position in the retaining screw cavity 62 in such a manner that the locking pin opening 80 in the skirt 78 thereof is aligned with and accommodates the locking pin 56, thus the retaining screw cap 54 can be restrained from spinning around inside the retaining screw cavity 62.

The crank arm extension 44 is then attached to the crank arm 42. This is done by positioning the crank extension 44 atop the crank arm 42 and inserting the crank arm extension axle 50 into position. That is, the shank 110 of the crank arm extension axle 50 is inserted through the crank arm extension pivot opening 102 and through the corresponding opening 87 in the crank arm 42. The crank arm extension axle 50 is oriented so that the locking pin channel 114 in the distal end 110 thereof resides in registration with the second end 84 of the locking pin 56. This engagement can restrain the crank arm extension axle 50 from rotating, which would otherwise force the opening ends of the snap ring 58 against the wall of boss 60, and cause the snap ring 58 to disengage from the snap ring channel 116.

With the component parts of the crank assembly 40 coupled together as described, the crank arm 42 is rotatable about the crank arm axis 21 and is coupled to drive the spool 14 of the reel 10 in rotation. The crank arm extension 44 is rotatably coupled to the crank arm 42 at the crank arm extension axis 112, as illustrated in FIG. 2.

The crank arm extension axis 112 passes through the crank arm 42 equidistant from both of the detent recesses 86 and 88. Both of the detent recesses 86 and 88 are formed as pockets extending parallel to the crank arm extension axis 112. The detent pin 118 is oriented parallel to the crank arm extension axis 112 as well. Also, the crank arm extension axis 112 lies between the free end 105 and the latching end 103 of the crank arm extension 42. The crank arm extension axis 112 also lies in linear radial alignment with the detent recesses 86 and 88 relative to the crank arm axis 21. The crank arm extension offset distance D is thereby defined as the distance between each of the detent recesses 86 and 88 and the crank arm extension axis 112.

The retractable spring loaded detent pin 118 is biased by the spring 128 toward the crank arm 42. The detent pin 118 is mounted on the latching end 103 of the crank arm extension 42 at the same offset distance D from the crank arm extension axis 112 as the detent recesses 86 and 88. Because of this the detent pin 118 is selectively and alternatively engageable in both of the detent recesses 86 and 88 to thereby hold the free end 105 of the crank arm extension 42 at alternative distances from the crank arm axis 21.

The detent pin gateways 92 and 94 formed in the crank arm 42 are also located at the crank arm extension offset distance D from the crank arm extension axis 112. Likewise, the detent abutments 96 and 100 that are located beyond the detent recess pockets 88 and 86, respectively, on the sides thereof opposite their respective cam surfaces 97 and 98, are also located at the same crank arm extension offset distance D from the crank arm extension axis 112.

To change the effective lever arm of the crank assembly 40, the detent knob 124 is lifted upwardly away from the crank arm extension 44. This overcomes the bias of the spring 128, which is compressed even further, and draws the protruding tip of the detent pin 118 out of the detent recess 86 or 88 in which it has been engaged.

A slight rotation of the crank arm extension 44 in a clockwise direction about the crank arm extension axis 112, as viewed in FIG. 2, brings the detent pin 118 out of registration with whichever detent recess 86 or 88 it has been aligned. If the detent pin 118 was initially engaged in the detent recess 86 and is thereupon disengaged therefrom by lifting the knob 124 and rotating the crank arm extension 44 slightly in a clockwise direction, the crank arm extension 44 will freely rotate relative to the crank arm 42 through an angular arc of a total of one hundred eighty degrees. As the detent pin 118 approaches the end of the crank arm 42 that carries the boss 60, the tip of the detent pin 118 enters the gateway 94 at the top of the side of the boss 60. Continued clockwise rotation of the crank arm extension 44 relative to the crank arm 42 causes the detent pin 118 to ride up the cam surface 97, depressing the detent pin 118 upwardly and further compressing the spring 128 as it proceeds. Once the detent pin 118 has been rotated into coaxial alignment with the detent recess pocket 88, the pressure on the detent pin 118 opposing the bias of the spring 128 is removed. The spring 128 thereupon pushes the detent pin 118 outwardly toward the crank arm 42 to engage it in the detent recess pocket 88. The abutment 96 on the far side of the detent recess pocket 88 from the cam surface 97 ensures that the operator cannot inadvertently rotate the detent pin 118 past the detent recess 88.

Engagement of the detent pin 118 in the detent recess pocket 88 is best illustrated in FIG. 15. Rotational movement of the crank arm extension 44 in the direction 134 brings the detent pin 118 into contact with the crank arm 42 at the detent pin receiving gate opening 94 in the crank arm side wall above the boss 60. Continued rotation of the crank arm extension 44 about its axis 112 causes the detent pin 118 to ride up the cam surface 97, thereby more fully compressing the spring 128, until it arrives at the retaining screw receiving cavity 62. As the detent pin clears the side wall of the crank arm 42 at the top of the cam surface 97, it passes into alignment with the cap 54. The detent pin 118 is then carried by continued rotation of the crank arm extension 44 in the direction 134 across the flat surface 76b which is perpendicular to the crank arm axis 21.

Once the detent pin 118 arrives at the detent recess pocket 88, the resistance of the surface 76b is removed, thereby allowing the spring 128 to push the detent pin 118 down into detent recess pocket 88. The abutment 96 ensures that the detent pin 118 cannot move past the detent recess pocket 88 unless the user purposefully lifts the knob 124 so that the tip of the detent pin 118 can clear the elevated surface 76a on the top 76 of the cap 54.

As is evident from a comparison of FIGS. 4 and 6, disengagement of the detent pin 118 from the detent recess 86 and engagement of the detent pin 118 in the detent recess 88 increases the effective length and the mechanical moment of the crank assembly 40. Specifically, this increase in length is equal to twice the distance D. That is, when the detent pin 118 is engaged in the detent recess 86, the effective length of the crank mechanism 40 is equal to the distance A between the handle mounting opening 106 in the crank arm extension 44 and the crank arm axis 21, depicted in FIG. 4. However, when the detent pin has been disengaged from the detent recess 86 and reengaged in the detent recess 88, the effective length of the lever arm of the crank mechanism 40 is equal to the distance between the handle opening 106 and the crank arm extension axis 112, which has been brought into coaxial alignment with the crank arm axis 21. The effective length of the lever arm of the crank mechanism 40 is thereupon equal to the distance A+D+D as illustrated in FIG. 6.

To return the mechanism to a position having a shorter effective lever arm, the detent knob 124 is lifted upwardly when the crank mechanism 40 is initially engaged as depicted is FIG. 5 to overcome the bias of the spring 128 and withdraw the detent pin 118 from the detent recess 88. A slight clockwise rotation of the crank arm extension 44 relative to the crank arm 42 brings the detent pin 118 out of alignment with the detent recess 88 so as to prevent reengagement of the detent pin 118 therein. Continued clockwise rotation of the crank arm extension 44 relative to the crank arm 42 through a total arc of one hundred eighty degrees causes the detent pin 118 to become reengaged in the detent recess 86.

This reengagement occurs automatically without any necessity for lifting the knob 124 since the configuration of the crank assembly 40 causes the detent pin 118 to be depressed as it approaches the detent recess 86. That is, as the detent pin 118 approaches the side wall 90 of the crank arm 42, it enters the gateway 92 and proceeds along the cam surface 98 forming the floor of the channel 99 which slopes upwardly from the gateway 92 toward the detent recess 86. As the detent pin 118 reaches alignment with the detent recess 86, the pin depressing pressure applied by the cam surface 98 is removed as the detent pin 118 leaves contact with the cam surface 98. The spring 128 thereupon reengages the detent pin 118 in the detent recess 86.

The action of the cam surface 98 in depressing the detent pin 118 is illustrated most clearly in FIG. 14. As illustrated in that drawing figure, when the detent pin 118 is carried in an arc by rotation of the crank arm extension 44 about its axis 112, it reaches the structure of the crank arm 42 at the gate opening 92 therein. Continued rotation of the crank arm extension 44 in the direction indicated by the directional arrow 134 causes the detent pin 118 to be depressed upwardly as it rides up the cam surface 98. This partially compresses the spring 128 within the detent pin mounting assembly 48.

Rotation of the crank arm extension 44 further in the direction indicated by the directional arrow 134 causes the detent pin 118 to ride, while in a partially retracted condition, across the flat, upper surface of the floor 101 of the channel 99 leading to the detent recess pocket 86. Once the detent pin 118 arrives in registration with the detent recess 86, resistance to the force of the spring 128 is no longer present, thus allowing the spring 128 to push the detent pin 118 down into the recess pocket 86. Furthermore, since the floor 101 of the channel 99 is recessed beneath the level of the surface 45 forming the top of the abutment 100, the detent pin 118 cannot be rotated past the detent recess pocket 86 without purposefully lifting the knob 124 upwardly so that the detent pin 118 will clear the edge of the abutment 100 at the transition between the abutment 100 and the flat, upper surface 45 of the crank arm 42.

As in conventional reels, the crank arm 42 is engaged so that it will rotate the spool 14 only in the direction that reels in the line. The crank arm 42 is disengaged from the spool 14 by means of the latching lever 18 when the user wishes to play out line from the spool 14. As a consequence, the crank arm 42 will rotate in only a single direction relative to the reel spool and drive housing 16. Specifically, as viewed in FIGS. 1 and 2, the crank arm 42 will rotate only in a clockwise direction. As a result, when the crank arm extension 44 is engaged with the crank arm 42 in either position of lever arm adjustment, it likewise can be rotated in only a single direction, which is clockwise as viewed in FIGS. 1 and 2.

To alternate between the different moment arms A and A+D+D, the knob 124 of the detent pin mounting assembly 48 is lifted so as to withdraw the detent pin 118 from the detent recess pocket 86 or 88 with which it is engaged. With a slight movement of the crank arm extension 44 to bring the detent pin 118 out of alignment with the detent recess with which it has been engaged, the crank arm extension 44 can be rotated in either direction relative to the crank arm 42. However, it will only reengage with the other detent recess if moved in a clockwise direction as viewed in FIGS. 1 and 2. This is because interaction between the detent pin 118 and one of the cam surfaces 97 or 98 is required in order to automatically depress the detent pin 118 so that it can be rotated into alignment with either the detent recess pocket 86 or the detent recess pocket 88.

In FIGS. 1–17 the crank arm extension 44 is shown as being equipped with a T-handle 46. However, unlike conventional T-handles, the T-handle 46 is detachable from the crank mechanism 40. The structure in this regard is best illustrated in FIGS. 3, 5, and 17.

As best illustrated in FIG. 17, a generally cylindrical spindle 136 is secured in the crank handle opening 106 at the free end 105 of the crank arm extension 44 by a permanent connection indicated at 138. An annular channel 140 is formed in the outer surface of the spindle 136 near its upper extremity. The channel 140 is of a diameter adapted to receive a C-shaped snap ring 142, depicted in plan view in FIG. 17A.

An elongated, tubular bushing 144 is mounted coaxially about the spindle 136 and is freely rotatable relative thereto. The bushing 144 is externally threaded with left-hand threads at its upper extremity 146. The opposite end 148 of the bushing 144 is externally machined to form two flat, mutually parallel surfaces 150 on opposite sides of the bushing 144. The flat surfaces 150 are spaced apart a distance that allows engagement by the open wrench jaws 32 of the wrench 30 depicted in FIG. 21.

The bushing 144 slides onto the spindle 136 and is secured thereto by means of the C-shaped snap ring 142 as best depicted in FIG. 19. The outer diameter of the snap ring 142 is slightly smaller than the outer diameter of the upper end 146 of the bushing 144. This provides clearance so that the internally tapped socket 152 permanently molded or machined into a crosspiece 154 will clear the snap ring 142. The socket 152 has internal threads indicated at 156, which are also left-hand threads of the same pitch and diameter as the threads on the upper end 146 of the bushing 144.

As is evident from FIGS. 17 and 19, the crosspiece 154 can be threadably engaged with the bushing 144 by screwing the crosspiece 154 onto the bushing 144 by rotation thereof in a left-hand direction. This engages the left-hand male threads 146 with the left-hand female threads 156. The left-hand thread design of this arrangement prevents the T-handle 46 from becoming unintentionally disengaged from the crank arm extension 44. Since the crank arm extension 44 can only rotate in a clockwise direction relative to the reel casing 16, as viewed in FIGS. 1 and 2, when cranking the force that is applied to the crosspiece 154 tends to further engage the threads 146 and 156. That is, this force tends to drive the bushing 144 in the same direction as the left-hand threads. As a result, the crosspiece 154 will remain firmly engaged on the bushing 144, thereby ensuring that the T-handle 46 does not come free from the crank arm extension 44.

To further enhance the connection between the bushing 144 and the crosspiece 154, an inward bore is defined in the crosspiece 154. This bore has a frustoconical bore wall 155 that extends from the open mouth of the socket 152 embedded within the crosspiece 154 and increases in diameter to its opening at the surface of the crosspiece 154. The angle of taper of the frustoconical bore wall 155 is preferably about two or three degrees.

The bushing 144 has a radially outwardly facing contact surface 145 located longitudinally adjacent to the threads 144 thereon on a portion of its structure that projects radially outwardly beyond the diameter of the threads 146. The contact surface 145 extends approximately the same longitudinal length as the frustoconical bore surface 155, and may have either a matching frustoconical shape, or a cylindrical shape. With either configuration the contact surface 145 wedges against the frustoconical bore wall 155 as the threads 146 of the bushing 144 are advanced into engagement with the threads 156 of the socket 152. This wedging action between the contact surface 145 and the frustoconical bore surface 155 produces a tight frictional grip between the bushing 144 and the crosspiece 154, in addition to the attachment created by interengagement of the threads 146 and 156. This frictional grip creates a tight fit and enhances the engagement of the crosspiece 154 and the bushing 144. This tight friction trip further ensures that the handle 46 does not come free from the crank arm extension 44. The tight fit also serves to prevent water and dirt from entering the bore in the crosspiece 154.

The T-handle 46 is detachable from the crank arm extension 44 if desired, however. To disconnect the crosspiece 154 from the bushing 144, the open wrench jaws 32 of the wrench 30 are engaged on the flat surfaces 150 of the end 148 of the bushing 144. The crosspiece 154 is then turned in a clockwise direction relative thereto, as viewed in FIGS. 1 and 2. The crosspiece 154 can thereupon be unscrewed from the bushing 144.

For bottom fishing, or straight down fishing, many people prefer a handgrip that extends parallel to the crank arm extension axis 112. In the embodiment of the invention illustrated, such a detachable handgrip is indicated at 158 in FIG. 18. The handgrip 158 also has a socket 152 molded or machined therein. The internal, left-hand female threads 156 of the socket 152 in the straight handgrip 158 can also be engaged with the left-hand male threads 146 on the bushing 144. The straight handgrip 158 also has a frustoconical bore wall 155 to frictionally engage the contact surface 145 of the bushing 144. If one desires a T-shaped handle 46, one merely engages the crosspiece 154 with the bushing 144 in the manner previously described. Alternatively, the user can remove the crosspiece 154 and replace it with the straight handle 158. As a consequence, the user is afforded the flexibility of alternative detachable fishing reel crank handles.

Undoubtedly, numerous variations and modifications of the invention will become readily apparent to those familiar with reels of the type suitable for use in fishing. However, it is to be understood that the application of the invention is not necessarily limited to such a use. The reel of the invention can, for example, be adapted for use with tape measures, chalk lines, kite lines, and other devices in which line is wound on a spool and retrieved by means of a reel having a crank. Accordingly, the scope of the invention should not be construed as limited to this specific embodiment illustrated and described.

I claim:

1. A dual-leverage reel comprising:
   a spool for winding a line,
   a crank arm having a crank arm axis and coupled to drive said spool in rotation,
   a pair of detent recesses defined on said crank arm, whereby one of said detent recesses is radially displaced from said crank arm axis a greater distance than the other of said detent recesses,
   a crank arm extension having a free end and a latching end,
   a crank arm extension axle defining a crank arm extension axis that is parallel to said crank arm axis and which joins said crank arm extension between said free and latching ends thereof to said crank arm at a location thereon equidistant from both of said detent recesses and in linear radial alignment therewith relative to said crank arm axis, thereby defining a common crank arm extension offset distance between each of said detent recesses and said crank arm extension axis,
   a retractable spring-loaded detent pin biased toward said crank arm and mounted on said latching end of said crank arm extension at said same offset distance from said crank arm extension axis as said detent recesses, whereby said detent pin is selectively and alternatively engageable in both of said detent recesses to thereby hold said free end of said crank arm extension at alternative distances from said crank arm axis.

2. A dual-leverage reel according to claim 1 wherein said other of said detent recesses lies on said crank arm axis, and said detent recesses face said crank arm extension and extend parallel to said crank arm axis and said crank arm has side walls into which a pair of detent pin receiving gate openings are formed at said crank arm extension offset distance from said crank arm extension axis to permit passage of said detent pin, and said crank arm also has a cam surface leading from each of said gate openings to said detent recesses to progressively depress said detent pin so that when said detent pin reaches registration with said detent recesses, said detent pin latches therein.

3. A dual-leverage reel according to claim 2 wherein said crank arm defines an abutment at each of said detent recesses on the opposite side thereof from said cam surface and said gate opening.

4. A dual-leverage reel according to claim 2 further comprising a drive shaft having a crank attachment end extending from said spool and having an axially tapped bore therein that defines said crank arm axis, and wherein said crank arm includes a longitudinally projecting boss, with a crank retaining screw seating cavity defined therein and which defines an axial shaft opening which fits on said drive shaft in keyed engagement therewith, and a radially directed locking pin opening defined therethrough and further comprising a crank retaining screw having a shank that coaxially engages said axially tapped bore in said drive shaft and a retaining screw head that clamps said crank arm onto said drive shaft and said retaining screw head has at least one radial indentation therein longitudinally and radially aligned with said locking pin opening, a locking pin having first and second ends and disposed in said locking pin opening so that said first locking pin end fits into said radial indentation in said retaining screw head, and said crank arm extension axle has a shank with a radial indentation therein into which said second end of said locking pin projects, whereby said locking pin prevents relative rotation between said drive shaft and said crank retaining screw.

5. A dual-leverage reel according to claim 4 wherein said crank arm extension axle is formed as a cylindrical axle pin having a proximal end with an enlarged head formed thereon and a distal end with a radially directed, annular channel defined therein, and a C-shaped snap ring is engaged in said annular channel on said distal end of said shank of said cylindrical axle pin.

6. A dual-leverage reel according to claim 4 further comprising a hollow, cup-shaped cap formed with a top forming a roof over said crank retaining screws seating cavity and an annular skirt depending from said roof and said cap fits into said retaining screw seating cavity, so that said roof covers said crank retaining screw head, and said cap skirt has a radial opening therein to receive therethrough said first end of said locking pin, and wherein said other of said detent recesses lies on said crank arm axis, and said detent recesses face said crank arm extension and extend parallel to said crank arm axis and said crank arm has side walls into which a pair of detent pin receiving gate openings are formed at said crank arm extension offset distance from said crank arm extension axis to permit passage of said detent pin, and said crank arm also has a cam surface leading from each of said gate openings to said detent recesses to progressively depress said detent pin so that when said detent pin reaches registration with said detent recesses, said detent pin latches therein and said top of said cap forms said abutment adjacent said other of said detent recessions on the side thereof opposite said cam surface leading thereto.

7. A dual-leverage reel according to claim 1 wherein said crank arm extension is provided with a detachable handgrip.

8. A dual-leverage reel according to claim 7 wherein said detachable handgrip has a T-shaped configuration and further comprising a handle shank oriented parallel to said crank arm extension axis and said handle shank is rotatably joined to said free end of said crank arm extension and is releasably engaged with said handgrip.

9. A dual-leverage reel according to claim 7 wherein said detachable handgrip is oriented parallel to said crank arm extension axis and is rotatably joined to said free end of said crank arm extension.

10. A dual leverage reel according to claim 7 further comprising a handle shank oriented parallel to said crank arm extension axis and rotatably joined to said free end of said crank arm extension and said handle shank has defined thereon a radially projecting contact surface, and said handgrip has defined therein an inwardly tapered bore having a frustoconical bore wall, whereby said radially projecting contact surface of said handle shank frictionally grips said bore wall to enhance engagement of said handgrip with said handle shank.

11. A dual-leverage reel according to claim 7 wherein said crank arm is coupled to said spool to rotate in but a single direction of rotation, and said detachable handgrip is attached to said crank arm extension by means of a left-hand threaded connection.

12. A dual-leverage reel comprising:
a take up spool for winding a length of line,
a crank arm rotatable about a crank arm axis and coupled to drive said spool in rotation,
a pair of detent recesses defined on said crank arm wherein one of said detent recesses is radially displaced from said drank arm axis a greater distance than the other,
a crank arm extension axle defining a crank arm extension axis parallel to said crank arm axis and said crank arm extension axle is coupled to said crank arm midway between said detent recesses, whereby each of said detent recesses lies at a crank arm extension offset distance from said crank arm extension axis,
a crank arm extension having a free end and an opposite latching end, and said crank arm extension axle couples said crank arm extension between said free end and said latching end thereof to said crank arm for rotation relative thereto,
a detent pin mounted on said latching end of said crank arm extension at a distance from said crank arm extension axis equal to said crank arm extension offset distance, and
a spring urging said detent pin toward said crank arm, whereby said detent pin is selectively and alternatively engageable with each of said detent recesses so that a force of rotation is applicable to said spool from said free end of said crank arm extension with alternative mechanical moments.

13. A dual-leverage reel according to claim 12 wherein said other of said detent recesses lies on said crank arm axis and both of said detent recesses are formed as pockets extending parallel to said crank arm extension axis, and said detent pin is oriented parallel to said crank arm extension axis and said crank arm has sides into which detent pin gateways are formed at said crank arm extension offset distance from said crank arm extension axis, cam surfaces on said crank arm leading from said detent pin gateways toward said detent recess pockets, and detent abutments located beyond said detent recess pockets on sides thereon opposite said cam surfaces and also at said crank arm extension offset distance from said crank arm extension axis.

14. A dual-leverage reel according to claim 13 further comprising a handgrip extending parallel to said crank arm extension axis and detachably mounted on said free end of said crank arm extension to project therefrom away from said crank arm.

15. A dual-leverage reel according to claim 14 wherein said handgrip has a T-shaped configuration.

16. A dual-leverage reel according to claim 12 further comprising a spool drive shaft extending from said spool and defining said crank arm axis and wherein said crank arm is secured to said drive shaft in keyed engagement therewith, and further comprising a crank retaining screw advanced axially into said drive shaft in threaded engagement therewith for securing said crank arm to said drive shaft, and removable locking means for preventing disengagement of said crank retaining screw from said drive shaft.

17. A dual-leverage reel according to claim 12 wherein said other of said detent recesses is coaxial with said crank arm axis.

18. A dual-leverage reel according to claim 12 wherein said other of said detent recesses is located on said crank arm axis.

19. A dual-leverage reel according to claim 18 wherein said crank arm and said crank arm extension have mutually facing surfaces oriented parallel to each other and perpendicular to the orientation of said detent recesses, said crank arm axis, said crank arm extension axis, and said detent pin, and said crank arm has sides into which detent pin gates are formed at the same distance from said crank arm extension axis as the distance between each of said detent recesses and said crank arm extension axis, and cam surfaces leading from said detent pin gates toward said detent recesses.

20. A dual-leverage reel according to claim 19 wherein said crank arm defines detent pin abutments adjacent said detent recesses and on sides thereof opposite said cam surfaces.

21. A dual-leverage reel comprising:
a take-up spool for winding and unwinding a length of line thereon and rotatable about a spool axis,
a crank arm rotatable about a crank arm axis and coupled to rotate said spool, wherein said crank arm includes a pair of detent recesses one of which is located at a greater radial distance from said crank arm axis than the other,
a crank arm extension rotatably coupled to said crank arm at a crank arm extension axis that is parallel to said crank arm axis and which passes through said crank arm equidistant from both of said detent recesses, and said crank arm extension axis divides said crank arm extension into a longer section having a free end and a shorter section having a latchable end,
a retractable detent pin directed toward said crank arm and located on said shorter section of said crank arm extension at said latchable end thereof at the same distance from said crank arm extension axis as the distance between each of said detent recesses and said crank arm extension axis, and
spring biasing means urging said detent pin toward said crank arm, whereby said detent pin is selectively and alternatively engageable with each of said detent recesses to hold said latchable end of said crank arm extension at alternative distances from said crank arm axis, thereby providing said crank arm extension with lever arms of different lengths.

* * * * *